United States Patent
Jones, II et al.

(10) Patent No.: US 10,218,202 B2
(45) Date of Patent: Feb. 26, 2019

(54) CHARGING OF ELECTRONIC DEVICES ON AN AIRCRAFT

(71) Applicant: INTERNATIONAL BUSINESS MACHINES CORPORATION, Armonk, NY (US)

(72) Inventors: Shelton Jones, II, Durham, NC (US); Raquel A. Prieto-Canter, Durham, NC (US); Navya Ramanjulu, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 31 days.

(21) Appl. No.: 15/422,676

(22) Filed: Feb. 2, 2017

(65) Prior Publication Data
US 2018/0219385 A1    Aug. 2, 2018

(51) Int. Cl.
*H02J 7/00* (2006.01)
*H04B 1/3827* (2015.01)

(52) U.S. Cl.
CPC ............ *H02J 7/007* (2013.01); *H02J 7/0047* (2013.01); *H04B 1/3827* (2013.01)

(58) Field of Classification Search
CPC ............................... H02J 7/007; H02J 7/0047
USPC ...................................................... 320/107
See application file for complete search history.

(56) References Cited

U.S. PATENT DOCUMENTS

| | | | |
|---|---|---|---|
| 9,019,068 B2 | 4/2015 | Varoglu | |
| 2005/0007967 A1 | 1/2005 | Keskar et al. | |
| 2007/0027580 A1* | 2/2007 | Ligtenberg | G05D 23/19 |
| | | | 700/300 |
| 2009/0186633 A1 | 7/2009 | Yonker et al. | |
| 2014/0242966 A1 | 8/2014 | Keating et al. | |
| 2015/0079962 A1 | 3/2015 | Baker et al. | |
| 2015/0187187 A1 | 7/2015 | Del Toro et al. | |
| 2015/0248660 A1 | 9/2015 | Muirhead | |
| 2015/0280791 A1* | 10/2015 | Azami | H04B 5/0037 |
| | | | 307/104 |
| 2016/0050309 A1 | 2/2016 | Gooberman | |

* cited by examiner

*Primary Examiner* — Suchin Parihar
(74) *Attorney, Agent, or Firm* — Cantor Colburn LLP; William A. Kinnaman, Jr.

(57) ABSTRACT

A computer-implemented method for charging an electronic device on an aircraft is provided. The method includes monitoring a charging station on the aircraft by a charging control module, determining whether the electronic device has been connected to the charging station and receiving, via the charging control module, an indication that operation of the electronic device should be restricted to airplane mode. The method also includes transmitting a command by the charging control module through charging station to the electronic device to instruct the electronic device to operate in airplane mode and determining whether the electronic device is operating in airplane mode. Based on a determination that the electronic device is operating in airplane mode, the method includes activating the charging station. Based on a determination that the electronic device is not operating in airplane mode, the method includes disabling the charging station.

19 Claims, 4 Drawing Sheets

CHARGING OF ELECTRONIC DEVICES ON AN AIRCRAFT

BACKGROUND

The present disclosure relates to the field of charging electronic devices, and more specifically, to charging of electronic devices on an aircraft.

Millions of people fly commercially each day and the amount of passengers that use their personal electronic devices while flying continues to increase. During certain periods of flight, the use of personal electronic devices can be dangerous. Accordingly, there are specific times where the pilots and crew instruct the passengers to limit their use of personal electronic devices to airplane mode, which is an operation mode in which the personal electronic device does not use any wireless communications, such as Wi-Fi, cellular data, Bluetooth, or the like. However, airline passengers often forget to change the operational mode of their personal electronic devices to airplane mode.

SUMMARY

According to one embodiment, a computer-implemented method for charging an electronic device on an aircraft is provided. The method includes monitoring a charging station on the aircraft by a charging control module, determining whether the electronic device has been connected to the charging station and receiving, via the charging control module, an indication that operation of the electronic device should be restricted to airplane mode. The method also includes transmitting a command by the charging control module through charging station to the electronic device to instruct the electronic device to operate in airplane mode and determining whether the electronic device is operating in airplane mode. Based on a determination that the electronic device is operating in airplane mode, the method includes activating the charging station. Based on a determination that the electronic device is not operating in airplane mode, the method includes disabling the charging station.

According to one embodiment, a computer program product for charging an electronic device on an aircraft, the computer program product comprising a computer readable storage medium having program instructions embodied therewith, the program instructions executable by a processor to cause the processor to perform a method. The method includes monitoring a charging station on the aircraft by a charging control module, determining whether the electronic device has been connected to the charging station and receiving, via the charging control module, an indication that operation of the electronic device should be restricted to airplane mode. The method also includes transmitting a command by the charging control module through charging station to the electronic device to instruct the electronic device to operate in airplane mode and determining whether the electronic device is operating in airplane mode. Based on a determination that the electronic device is operating in airplane mode, the method includes activating the charging station. Based on a determination that the electronic device is not operating in airplane mode, the method includes disabling the charging station.

According to one embodiment, a system for charging an electronic device on an aircraft, the system comprising a charging control module having a memory comprising computer readable instructions and one or more processors for executing the computer readable instructions. The computer readable instructions include monitoring a charging station on the aircraft, determining whether the electronic device been connected to the charging station, and receiving, via the charging control module, an indication that operation of the electronic device should be restricted to airplane mode. The computer readable instructions also include transmitting a command by the charging control module through charging station to the electronic device to instruct the electronic device to operate in airplane mode and determining whether the electronic device is operating in airplane mode. Based on a determination that the electronic device is operating in airplane mode, the computer readable instructions also include activating the charging station. Based on a determination that the electronic device is not operating in airplane mode, the computer readable instructions also include disabling the charging station.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments include methods, systems, and computer program products for controlling the operational mode of personal electronic devices on an airplane by using an enhanced charging station and a charging control module. Many commercial airplanes have charging stations at each seat where passengers can charge their personal electronic devices. However, the charging stations are not presently configured to ensure that passengers are using their personal electronic devices safely while in flight. In exemplary embodiments, a charging control module communicates with a personal electronic device using a powerline communications protocol when the personal electronic device is connected to a charging station on the airplane.

In exemplary embodiments, the charging control module is able to transmit commands to a personal electronic device connected to a charging station and to determine an operational mode of the personal electronic device via the charging station. In exemplary embodiments, the flight crew of the airplane can use the charging control module to transmit commands that instruct connected personal electronic devices to enter airplane mode. In addition, the charging control module can determine if any connected personal electronic devices are not in airplane mode and can responsively deactivate the charging station for the corresponding personal electronic device.

Figure 1:
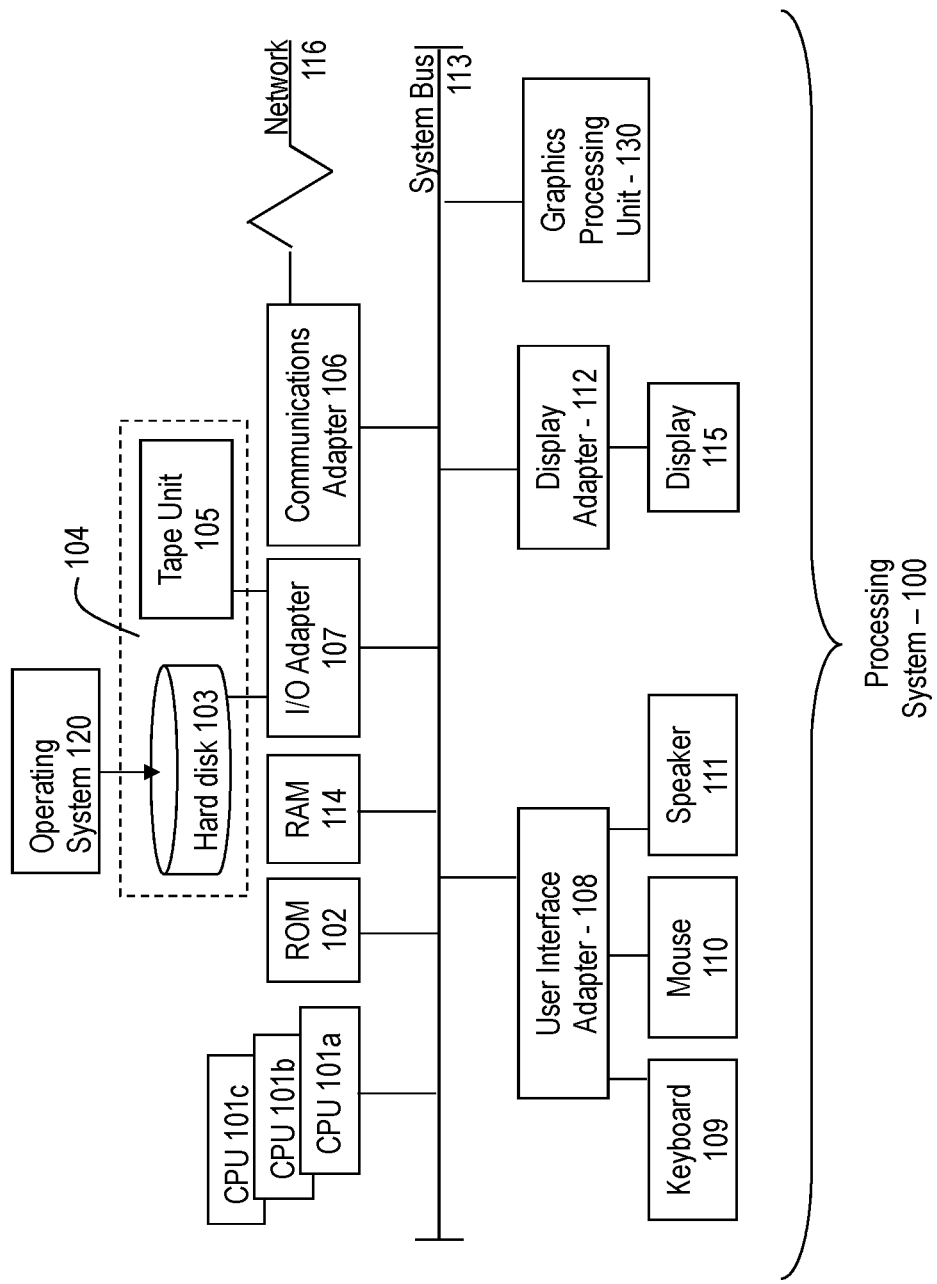
FIG. 1 illustrates a block diagram of a computer system for implementing some or all aspects of the system and method in accordance with one or more embodiments.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 1.

Figure 2:
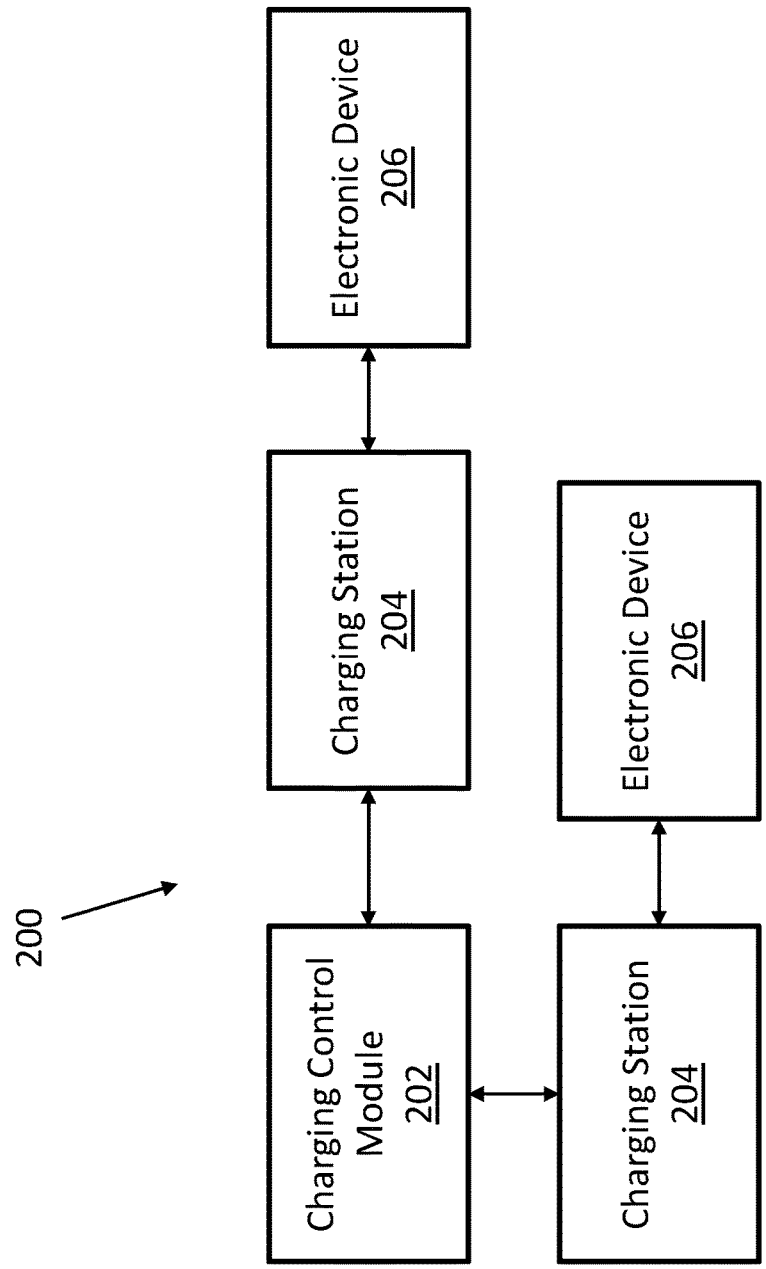
FIG. 2 is a block diagram of a system including a charging control module and a plurality of charging stations in accordance with an embodiment.

Referring now to FIG. 2, a block diagram of a charging system 200 in accordance with an embodiment of the disclosure is shown. As illustrated, the charging system 200 includes a charging control module 202, one or more charging stations 204 and electronic devices 206. In exemplary embodiments, the charging control module 202 may be a processing system such as the one shown in FIG. 1. The charging control module 202 is connected to each of the charging stations 204 and is configured to communicate with the personal electronic devices 206 that are connected to the charging stations 204 via a powerline communications protocol. In exemplary embodiments, the charging stations 204 include one or more of a universal serial bus (USB) connector, an alternating current (AC) connector, and a direct current (DC) connector that can be used to connect the charging station 204 to an electronic device 206. The electronic devices 206 can include, but are not limited to, smartphones, tablets, laptop computers, or the like.

Figure 3:
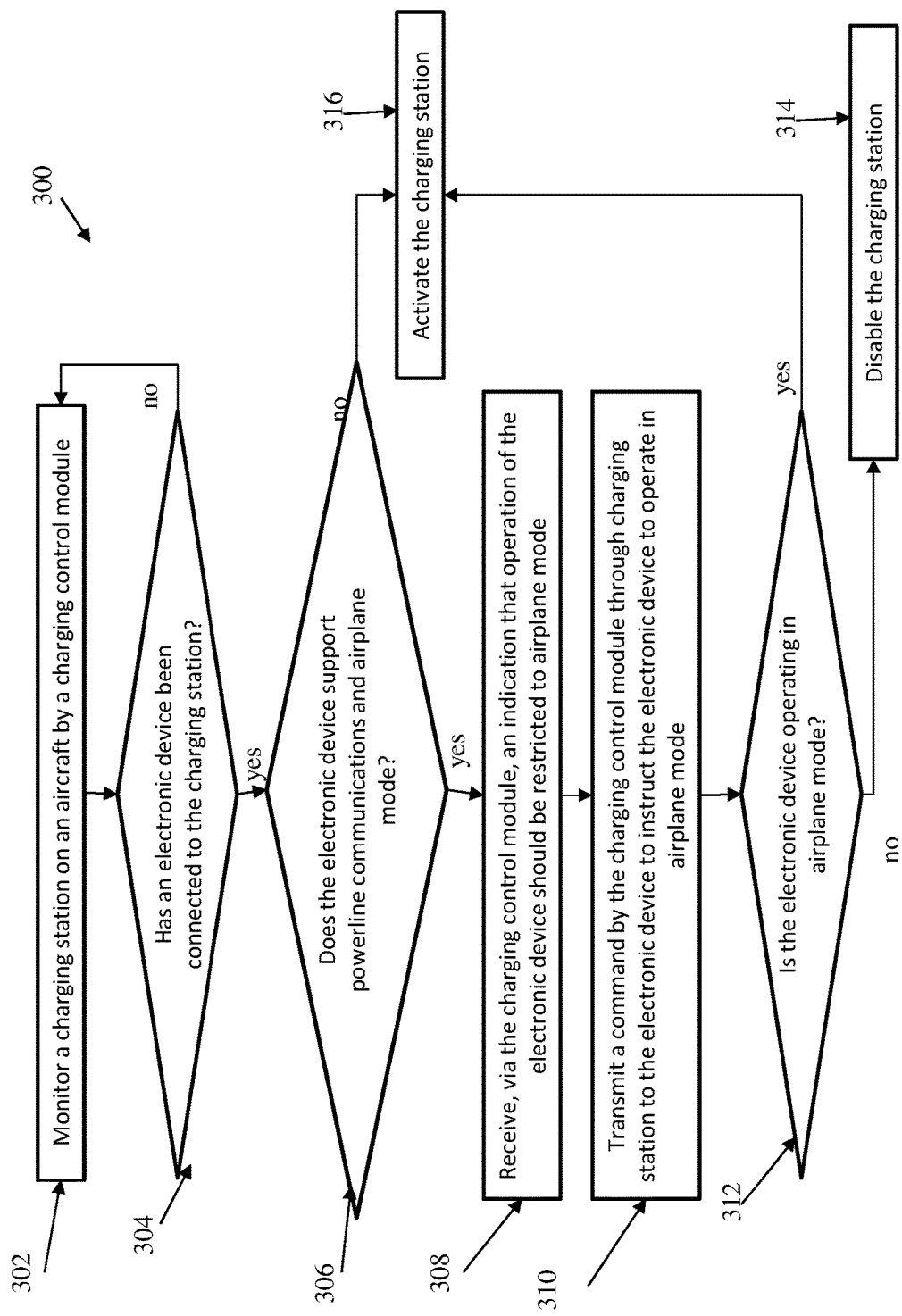
FIG. 3 is a flow chart illustrating a method for controlling the charging of electronic devices on an aircraft in accordance with an embodiment.

Referring now to FIG. 3, a flow chart illustrating a method 300 for controlling the charging of electronic devices on an aircraft in accordance with an embodiment is shown. As illustrated at block 302, the method 300 includes monitoring a charging station on an aircraft by a charging control module. Next, as shown at decision block 304, the method 300 includes determining if an electronic device has been connected to the charging station. In one embodiment, this determination can be made by the charging control module monitoring the current drawn by the charging station. The method 300 also includes determining if the electronic device supports powerline communications and airplane mode, as shown at decision block 306. In exemplary embodiments, the determination that the electronic device supports powerline communications and airplane mode can be made by the charging control module sending a message to the electronic device via the charging station and monitoring the charging station for a reply. If the electronic device does not support powerline communications or airplane mode, the method 300 proceeds to block 316 and activates the charging station so that the electronic device can be charged.

If the electronic device does support powerline communications and airplane mode, the method 300 proceeds to block 308 and includes receiving, via the charging control module, an indication that operation of the electronic device should be restricted to airplane mode. In one embodiment, this indication can be generated by an avionics system of the airplane based on the altitude of the airplane. In another embodiment, this indication can be received from a pilot or crew member via a user interface of the charging control module. Next, as shown at block 310, the method 300 includes transmitting a command by the charging control module through charging station to the electronic device to instruct the electronic device to operate in airplane mode.

Continuing with reference to FIG. 3, the method 300 also includes determining if the electronic device operating in airplane mode, as shown at decision block 312. If the electronic device is operating in airplane mode, the method 300 proceeds to block 316 and activates the charging station so that the electronic device can be charged. If the electronic device operating in not operating in airplane mode after receiving the command to operate in airplane mode, the method 300 proceeds to block 314 and disables the charging station to prevent the electronic device from being charged.

Figure 4:
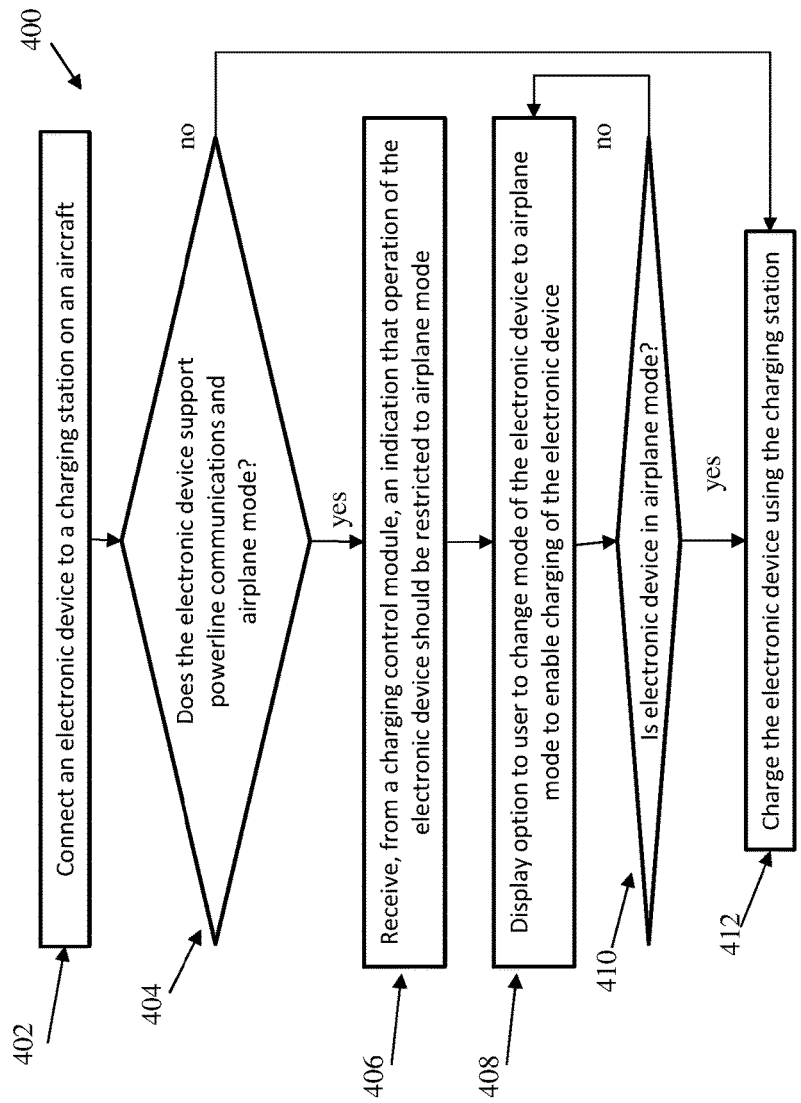
FIG. 4 is a flow chart illustrating another method for charging electronic devices on an aircraft in accordance with an embodiment.

Referring now to FIG. 4, a flow chart illustrating a method 400 for charging an electronic device on an aircraft in accordance with an embodiment is shown. As illustrated at block 402, the method 400 includes connecting an electronic device to a charging station on an aircraft. In exemplary embodiments, the electronic device can be connected to a charging station using one of a USB connector, an AC connector, and a DC connector. Next, as shown at decision block 404, the method 400 includes determining if the electronic device supports powerline communications and airplane mode. In exemplary embodiments, the determination that the electronic device supports powerline communications and airplane mode can be made by the charging control module sending a message to the electronic device via the charging station and monitoring the charging station for a reply. If the electronic device does not support powerline communications and airplane mode, the method 400 proceeds to block 412 and the electronic device is charged. If the electronic device does not support powerline communications and airplane mode, the method 400 proceeds to block 406.

Continuing with reference to FIG. 4, as shown at block 406, the method 400 includes receiving, from a charging control module, an indication that operation of the electronic device should be restricted to airplane mode. In exemplary embodiments, the indication that the electronic device should be restricted to airplane mode can be generated by an avionics system of the airplane based on the altitude, speed, location or any other suitable operational characteristic of the airplane. In another embodiment, this indication can be received from a pilot or crew member via a user interface of the charging control module. After the indication that the electronic device should be restricted to airplane mode is received, the method 400 includes displaying option to the user to change mode of the electronic device to airplane mode to enable charging of the electronic device, as shown at block 408.

The method 400 also includes determining whether the electronic device is in airplane mode, as shown at block 410. If the electronic device in airplane mode, the method 400 proceeds to block 412 and the electronic device is charged. However, if the electronic device is not in the airplane mode, the electronic device is not charged and the method returns to block 408 and again displays the option to the user to change mode of the electronic device to airplane mode to enable charging of the electronic device.

In exemplary embodiments, when an aircraft is at the gate before departure, a passenger can connect his or her electronic device to the charging station and charge the device while using mobile data or WiFi since the aircraft is not in flight. Upon departing the gate, the aircraft crew can utilize charging control module to request that passengers turn off their mobile devices or go into airplane mode. At this point, the charging control module will transmit a command to the connected electronic devices to display a message to the user of the electronic device that prompts the user to change the electronic device into airplane mode. For example, the message may say, "For safety reasons, this device will be set to airplane mode. Press Ok to continue or Press Cancel to regain access to your device and cease charging." Optionally, at this point, the prompt starts a timer, which can be customizable by the Airline, for the passenger to respond. The passenger can either press the Okay button or do nothing and let the device be switched into airplane mode and continue to receive the benefits of charging, or press the Cancel button and immediately regain control of his or her device. In the event that the user cancels the change to airplane mode, the charging station will no longer allow the phone to charge even though it is still plugged in. In exemplary embodiments, similar events will happen at different stages of the flight such as descending, cruise altitude, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises of one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for charging an electronic device on an aircraft, the method comprising:
   monitoring a charging station on the aircraft by a charging control module;
   determining whether the electronic device has been connected to the charging station;
   receiving, via the charging control module, an indication that operation of the electronic device should be restricted to airplane mode;
   transmitting a command by the charging control module through the charging station to the electronic device to instruct the electronic device to operate in airplane mode;
   determining whether the electronic device is operating in airplane mode;
   based on a determination that the electronic device is operating in airplane mode, activating the charging station; and
   based on a determination that the electronic device is not operating in airplane mode, disabling the charging station.

2. The method of claim 1, wherein the indication that operation of the electronic device should be restricted to airplane mode is received from an avionics system of the aircraft.

3. The method of claim 1, wherein the indication that operation of the electronic device should be restricted to airplane mode is received from a member of a flight crew of the aircraft.

4. The method of claim 1, wherein the charging station includes one or more of a universal serial bus (USB) connector, an alternating current (AC) connector, and a direct current (DC) connector.

5. The method of claim 1, further comprising:
   determining whether the electronic device supports powerline communication and airplane mode; and
   based on a determination that the electronic device does not support powerline communication and airplane mode, activating the charging station.

6. The method of claim 1, wherein the command to instruct the electronic device to operate in airplane mode includes instructions to display a request to a user of the electronic device to change a mode of the electronic device to airplane mode.

7. The method of claim 6, wherein the request indicates that charging will be disabled if the user does not change the mode of the electronic device to airplane mode.

8. A computer program product for charging an electronic device on an aircraft, the computer program product comprising a computer readable storage medium having program instructions embodied therewith, the program instructions executable by a processor to cause the processor to perform:
   monitoring a charging station on the aircraft by a charging control module;
   determining whether the electronic device been connected to the charging station;
   receiving, via the charging control module, an indication that operation of the electronic device should be restricted to airplane mode;
   transmitting a command by the charging control module through the charging station to the electronic device to instruct the electronic device to operate in airplane mode;
   determining whether the electronic device is operating in airplane mode;
   based on a determination that the electronic device is operating in airplane mode, activating the charging station; and
   based on a determination that the electronic device is not operating in airplane mode, disabling the charging station.

9. The computer program product of claim 8, wherein the indication that operation of the electronic device should be restricted to airplane mode is received from an avionics system of the aircraft.

10. The computer program product of claim 8, wherein the indication that operation of the electronic device should be restricted to airplane mode is received from a member of a flight crew of the aircraft.

11. The computer program product of claim 8, wherein the charging station includes one or more of a universal serial bus (USB) connector, an alternating current (AC) connector, and a direct current (DC) connector.

12. The computer program product of claim 8, wherein the program instructions are executable by the processor to cause the processor to further perform:
   determining whether the electronic device supports powerline communication and airplane mode; and
   based on a determination that the electronic device does not support powerline communication and airplane mode, activating the charging station.

13. The computer program product of claim 8, wherein the command to instruct the electronic device to operate in airplane mode includes instructions to display a request to a user of the electronic device to change a mode of the electronic device to airplane mode.

14. The computer program product of claim 13, wherein the request indicates that charging will be disabled if the user does not change the mode of the electronic device to airplane mode.

15. A system for charging an electronic device on an aircraft, the system comprising:
   a charging control module having a memory comprising computer readable instructions and one or more processors for executing the computer readable instructions, the computer readable instructions executable by the one or more processors to cause the one or more processors to perform:
   monitoring a charging station on the aircraft;
   determining whether the electronic device been connected to the charging station;
   receiving, via the charging control module, an indication that operation of the electronic device should be restricted to airplane mode;
   transmitting a command by the charging control module through the charging station to the electronic device to instruct the electronic device to operate in airplane mode, wherein the command includes instructions to display a request to a user of the electronic device to change a mode of the electronic device to airplane mode and wherein the request indicates that charging will be disabled if the user does not change the mode of the electronic device to airplane mode;
   determining whether the electronic device is operating in airplane mode;
   based on a determination that the electronic device is operating in airplane mode, activating the charging station; and
   based on a determination that the electronic device is not operating in airplane mode, disabling the charging station.

16. The system of claim 15, wherein the indication that operation of the electronic device should be restricted to airplane mode is received from an avionics system of the aircraft.

17. The system of claim 15, wherein the indication that operation of the electronic device should be restricted to airplane mode is received from a member of a flight crew of the aircraft.

18. The system of claim 15, wherein the charging station includes one or more of a universal serial bus (USB) connector, an alternating current (AC) connector, and a direct current (DC) connector.

19. The system of claim 15, wherein the computer readable instructions are executable by the one or more processors to cause the one or more processors to further perform:
   determining whether the electronic device supports powerline communication and airplane mode; and
   based on a determination that the electronic device does not support powerline communication and airplane mode, activating the charging station.

* * * * *